United States Patent [19]

Meschke et al.

[11] Patent Number: 4,855,403

[45] Date of Patent: Aug. 8, 1989

[54] CONNECTED BRANCH COPOLYMERS, METHODS FOR THEIR PRODUCTION, AND COPYING MATERIALS INCLUDING SAME

[75] Inventors: Debra J. Meschke, Valley Cottage, N.Y.; Kenneth L. Hoy, St. Albans, W. Va.

[73] Assignee: Union Carbide Corporation, Danbury, Conn.

[21] Appl. No.: 768,445

[22] Filed: Aug. 22, 1985

Related U.S. Application Data

[63] Continuation-in-part of Ser. No. 641,640, Aug. 17, 1984, which is a continuation-in-part of Ser. No. 468,670, Feb. 22, 1983, abandoned.

[51] Int. Cl.$^4$ .................. C08G 65/04; C08G 19/00
[52] U.S. Cl. ................................ 528/419; 528/60; 568/620; 524/623; 525/385; 525/450; 525/453; 525/430; 525/409; 525/474; 564/475; 523/205
[58] Field of Search .................. 528/419, 60; 568/620; 624/623; 525/385, 450, 453, 430, 409, 474; 564/475; 523/205

[56] References Cited

U.S. PATENT DOCUMENTS

| | | | |
|---|---|---|---|
| 2,552,528 | 5/1951 | De Groote | 568/624 |
| 2,552,529 | 5/1951 | De Groote | 568/624 |
| 2,552,532 | 5/1951 | De Groote | 568/624 |
| 2,605,232 | 7/1952 | De Groote | 560/85 |
| 3,637,869 | 1/1972 | Seizinger | 568/624 |
| 3,787,524 | 1/1974 | Grescentini et al. | 525/430 |
| 4,160,065 | 7/1979 | Loewrigkeit et al. | 528/60 |
| 4,289,872 | 9/1981 | Denkewalter et al. | 528/328 |
| 4,303,544 | 12/1981 | Kossing et al. | 568/624 |
| 4,371,634 | 2/1983 | Hoffman et al. | 523/205 |
| 4,435,548 | 3/1984 | Tomalia et al. | 528/363 |
| 4,568,737 | 2/1986 | Tomalia et al. | 528/363 |
| 4,587,329 | 5/1986 | Tomalia et al. | 528/363 |
| 4,594,366 | 6/1986 | Taylor et al. | 528/75 |

*Primary Examiner*—Harold D. Anderson
*Assistant Examiner*—Dennis R. Daley
*Attorney, Agent, or Firm*—Gerald L. Coon

[57] ABSTRACT

Capped connected branch copolymers are provided comprising a core segment, branched polymer segments attached to the core segment, linear polymer segments attached to the terminals of the branched polymer segments, and cap segments, which comprise residues of an alkylene oxide containing at least 4 carbon atoms and which are attached to the free terminals of the linear polymer segments. These capped copolymers are less water-soluble than the uncapped connected branched copolymers from which they are derived, and are useful in carbonless copying systems as carriers for the color precursor microcapsules. The microcapsules can be applied to the carbonless copying sheet by dispersing the microcapsules in the capped copolymer, heating the copolymer above its transition temperature and spreading the melted copolymer over the sheet. After cooling, the copolymer forms a coherent layer on the sheet. Since no water is required for application of the copolymer, the curling and wrinkling problems encountered when using aqueous dispersions of the microcapsules are avoided.

62 Claims, No Drawings

CONNECTED BRANCH COPOLYMERS, METHODS FOR THEIR PRODUCTION, AND COPYING MATERIALS INCLUDING SAME

This application is a continuation-in-part of our copending application Ser. No. 641,640, filed Aug. 17, 1984, which in turn is a continuation-in-part of our application Ser. No. 468,670, filed Feb. 22, 1983 and now abandoned.

FIELD OF THE INVENTION

This invention relates to connected branch copolymers, methods for their production and copying materials containing these connected branch copolymers. The connected branch copolymers of this invention are closely related to those described in our aforementioned application Ser. No. 641,640 (the entire disclosure of which is herein incorporated by reference), but are chemically modified in order to make the connected branch copolymers less water-soluble and, hence, more suitable for use in carbonless copying materials.

BACKGROUND OF THE INVENTION

Carbonless copying systems are known which use a top sheet, upon which an impression is placed by writing, typing or the like, and a copy sheet upon which a copy of the impressions placed upon on the top sheet appears. In such carbonless copying systems, the back surface of the top sheet (i.e., the surface of the top sheet on the opposed side from the surface on which the impressions are placed) is coated with a layer of a color precursor composition which, when pressure is exerted upon the top sheet as the impressions are placed thereon, releases a color precursor, a material which, in the form in which it is originally present on the top sheet, is either colorless or at least not strongly colored. The front surface of the copy sheet (i.e., the surface facing the back surface of the top sheet) is coated with a layer of a color developing composition which, when it comes into contact with the color precursor released from the top sheet, develops a strong color, thereby resulting in a colored copy of the original impression being produced upon the copy sheet. (The term "colored" as used herein does not exclude black and white, the only requirement being that contact between the color precursor and the color developing composition produces a color which can be perceived by the human eye. In many prior carbonless copying systems, the color developed is a deep blue or black, which makes a highly legible impression upon the copy sheet, which is typically a conventional white paper. In theory, one might use a color precursor/color developer composition combination which produce a white copy on a black copy sheet, although there are obvious practical difficulties to such an approach.)

It will be seen that, since the only functional requirement placed upon the color precursor and the color developing composition is that the color precursor be capable of being released from the top sheet and of interacting with the color developing composition to produce a colored impression upon the copy sheet, in theory the terms "color precursor composition" and "color developing composition" are interchangeable. Nevertheless, these two distinct terms will be used herein in their conventional sense in the art, since the chemical nature of the two materials is usually very different. The color precursors are typically complex organic materials containing strings of conjugated carbon-carbon bonds and are capable of existing in both an essentially colorless and a strongly colored form, depending upon the pH or degree of ionization of the organic compound. These organic color precursors are present in the layer on the top sheet either as liquids or as liquid solutions of the organic compounds. On the other hand, the color developing compositions are typically Lewis acids, often in the form of clays, which are spread on the front surface of the copy sheet and remain on that surface throughout the copying operation. However, this invention is not restricted to any particular form of color precursor o color developing composition, provided that the color precursor and the color developing composition used fulfill the aforementioned functional requirements.

One problem with such carbonless copying systems is that, for ease of use, the top and copy sheets are usually releasably secured to one another during manufacture so that they lie flat against one another with the surfaces of the sheets coated with the color precursor and color developing compositions adjacent and facing each other. Frequently, a plurality of sets of top and copy sheets are releasably secured together to form a pad of alternating top and copy sheets. (As will be well known to those skilled in the arts, such carbonless copying systems can be arranged to produce multiple copies by placing a second layer of color precursor composition on the back surface of the first copy sheet and providing a second copy sheet bearing a layer of color developing composition on its front surface, and so on. When such multiple-copy systems are assembled into pads, the pads of course comprises multiple sets of sheets, each set comprising one top sheet together with the requisite number of copy sheets.) Once the sheets have been thus assembled into pairs or pads, they are inevitably subject to stress due to handling, transportation and the like before they receive the desired impression on their top sheets and produce the desired copies of these impressions. Unfortunately, the undesired stresses due to handling, transportation and the like tend to result in unwanted release of color precursor from the top sheets, thereby producing undesired spurious and messy markings on the copy sheets.

Efforts have been made to eliminate such spurious markings by micro-encapsulation of the color precursor, the intent being that the microcapsules will be sufficiently robust that they will not rupture as a result of the relatively low stresses placed upon the sheets during handling, transportation and the like but will rupture readily under the much higher stresses produced when impressions are made upon the top sheet by writing, typewriting etc. Techniques for the production of such microcapsules are described in U.S. Re-issue Pat. No. 24899 issued Nov. 29, 1960 to Green (re-issue of U.S. Pat. No. 2,800,458) and in U.S. Pat. No. 2,800,457 issued July 23, 1957 to Green et al, and U.S. Pat. No. 2,800,458 issued on the same date to Green alone.

Although encapsulation of the color precursor does reduce the production of spurious markings, it creates difficulties in spreading the microcapsules uniformly over the back surface of the top sheet. As a practical matter, the only way of securing a sufficiently uniform distribution of the microcapsules on the top sheet is to apply the microcapsules in a liquid dispersion. Since most of the conventional micro-encapsulation materials used are natural organic compounds, such as gum arabic or gelatin, the microcapsules tend to be hydrophilic and hence the microcapsules are normally formed into an aqueous dispersion. A film of this aqueous dispersion is placed on the top sheet and then dried to produce the requisite layer of microcapsules. However, the placing of the aqueous layer on a top sheet made of paper (the usual sheet material, for obvious economic reasons), followed by drying of the paper sheet frequently results in distortion of the paper by curling and wrinkling.

Experiments have been conducted using a non-aqueous dispersion to apply the microcapsules to the paper. It might appear that one useful dispersion medium for the microcapsules would be paraffin wax or some similar waxy material, since such a material can be melted at a temperature which will not destroy the microcapsules, a liquid dispersion of the microcapsules in the melted wax spread on the paper, and the paper cooled to produce a solid, coherent layout of the microcapsules/wax dispersion on the paper without the risk of the paper curling or wrinkling. Unfortunately, because of the hydrophilic nature of most micro-encapsulation materials used commercially, the capsules themselves are, as already noted, hydrophilic and hence will not disperse easily in the intensely hydrophobic wax. Accordingly, it is extremely difficult to produce a sufficiently uniform dispersion of the microcapsules in the wax, and hence a sufficiently uniform distribution of the microcapsules on the paper. Wax is also more colored than is desirable for use in a color precursor composition and affects the color of the markings produced on the copy sheets.

In experiments leading to the present invention, an attempt was made to replace the intensely hydrophobic paraffin wax with a more hydrophilic thermoplastic synthetic resin, more specifically a polyethylene glycol, in the hope that the hydrophilic capsules would disperse more easily in a relatively hydrophilic synthetic resin, and that this synthetic resin could be melted and spread on the paper in the same way as paraffin wax. Unfortunately, it was found that the commercially-available polyethylene glycol sold under the Registered Trademark PEG 8000 by Union Carbide Corporation gave rise to several problems because of its water solubility, and it is believed that, having regard to their water solubility, substantially similar difficulties will be encountered in attempting to apply most prior art polyalkylene glycols as carriers for micro-encapsulated color precursors in carbonless copying systems. Because of the water solubility of the synthetic resin, any form of dampness, for example humidity, rain or even perspiration on the hands of the users, has extremely deleterious effects upon the coated sheets, for example, smudging, runny ink, bleed through, washing off of the ink, etc. However, PEG 8000 has no residual color, an acceptable transition temperature and good ability to disperse hydrophilic microcapsules. Accordingly, there is a need for a modified synthetic resin which, when used as a carrier for color precursor microcapsules, will retain the advantages of PEG 8000 while overcoming the difficulties due to its excessive water solubility. This invention provides such a modified synthetic resin, a process for the preparation, a color precursor composition containing the modified synthetic resin, a coated sheet for use in a carbonless copying system and coated with the color precursor composition of the invention, and a process for producing such a coated sheet.

SUMMARY OF THE INVENTION

Accordingly, this invention provides a capped connected branch copolymer comprising:

(A) a core segment having a valence of v, wherein v is an integer, and having correspondingly v terminal bonds connected to:

(B) v polyvalent, non-crosslinked branched polymer segments each having an average of t terminal bonds, where t is greater than about two, one of these terminal bonds being connected to the core segment, and each of the branched polymer segments being connected via its remaining (t-1) terminal bonds to:

(C) a set of linear polymer segments with an average of t-1 linear polymer segments per set, to provide a group of about v(t-1) linear polymer segments having substantially similar chain lengths and compositions within the group, the capped connected branch copolymer having a group of terminal linear polymer segments bearing groups capable of effecting hydrogen bonding; and (D) a set of cap segments connected to terminals of the terminal linear polymer segments which are not connected to the branch polymer segments, each of the cap segments comprising at least one residue of an alkylene oxide containing at least about 4 carbon atoms, there being on average at least about 0.5 of the alkylene oxide residues for each terminal of the terminal linear polymer segments not connected to the branched polymer segments.

This invention also provides a process for producing a capped connected branch copolymer, the process comprising procuring an uncapped connected branch copolymer having a core segment, branched polymer segments and linear polymer segments as defined in paragraphs (A)–(C) above, and reacting this uncapped connected branch copolymer with an alkylene oxide containing at least about 4 carbon atoms, the amount of the alkylene oxide reacted with the uncapped connected branch copolymer being at least about 0.5 molecule for each terminal of the terminal linear polymer segments of the connected branch copolymer which is not connected to the branched polymer segments, thereby causing the alkylene oxide to react with the terminal linear polymer segments of the uncapped connected branch copolymer to produce cap segments as defined in paragraph (D) above.

The invention also provides a color precursor composition for use in the preparation of carbonless copying sheets, this composition comprising a capped connected branch copolymer of the invention and a plurality of microcapsules dispersed in the capped connected branch copolymer, these microcapsules comprising a color precursor.

The invention also provides a coated sheet for use in a carbonless copying system, this coated sheet comprising a flat sheet of solid material having first and second flat surfaces on opposed sides thereof, the sheet being capable of receiving impressions on at least part of its first surface and having at least part of its second surface coated with a layer of a color precursor composition comprising a capped connected branch copolymer of the invention and a plurality of microcapsules dispersed in the capped connected branch copolymer, these microcapsules comprising a color precursor.

Finally, the invention provides a process for preparing a coated sheet for use in a carbonless copying system, this process comprising procuring a color precursor composition comprising a capped connected branch copolymer of the invention and a plurality of microcapsules dispersed in the capped connected branch copolymer, these microcapsules comprising a color precursor; keeping the color precursor composition to a temperature above the transition temperature of the capped connected branch copolymer but insufficient to cause substantial rupturing of the microcapsules, thereby rendering the color precursor composition flowable; spreading the flowable color precursor composition on to a flat sheet of solid material, the sheet having first and second flat surfaces on opposed sides thereof, the sheet being capable of receiving the impressions on at least part of its first surface, and the color precursor composition being spread over at least part of the second surface of the sheet; and allowing the color precursor composition on the second surface of the sheet to cool below its transition temperature, thereby producing a coherent solid layer of the color precursor composition on the second surface of the sheet.

The term "terminal linear polymer segments" is used herein to denote the group of linear polymer segments most remote from the core segment of the capped connected branch copolymer, these terminal linear polymer segments each having one terminal connected to a branched polymer segment, while the other terminal of each terminal linear polymer segment is not attached to a branched polymer segment. As described in detail below, the capped connected branch copolymers may have a plurality of groups of branched polymer segments and a plurality of groups of linear polymer segments alternating with the groups of branched polymer segments as one moves outwardly from the core segment of the capped connected branch copolymer. In such capped connected branch copolymers having multiple groups of branched and linear polymer segments, the inner, non-terminal group(s) of linear polymer segments will of course have both their terminals connected to differing groups of branched polymer segments and will thus not have any free terminals. In such complex connected branch copolymers, it is only the outermost, terminal group of linear polymer segments which must bear groups capable of effecting hydrogen bonding.

It will be appreciated that, because of the presence of the cap segments on at least some of the terminal linear polymer segments, the "terminal" linear polymer segments are not, strictly speaking, terminal segments. However the term "terminal" is used herein for convenience to denote this outermost group of linear polymer segments.

DETAILED DESCRIPTION OF THE INVENTION

The capped connected branch copolymers of the invention are modifications of the connected branch copolymers described in our aforementioned copending application Ser. No. 641,640. The connected branch copolymers described in this copending application possess the core segment, branched polymer segments and linear polymer segments defined in paragraphs (A)–(C) above, but do not possess the cap segments present in the copolymers of this invention. In order that the nature of the capped connected branch copolymers of the invention and the methods used for their preparation may be concisely described, the uncapped connected branch copolymers disclosed in the aforementioned copending application Ser. No. 641,640, and the methods used for their preparation, will first be described below, and thereafter the modifications required by the capped copolymers of the present invention, the methods for their preparation and their methods of use will be described.

The uncapped connected branch copolymers disclosed in the aforementioned copending application Ser. No. 641,640 are derived from three main classes of reactants. These reactants, when reacted together in the appropriate manner, form the three primary segments—core, branch, and linear—which make up the uncapped connected branch copolymer.

The core segment comprises a reactant which has at least one reactive functional group. The term core reactant encompasses any compound which by the presence of reactive groups acts as a nucleating agent on to which branching polymerization monomers can be bonded. The core reactant can therefore be monomeric or polymeric, organic or inorganic, monofunctional or polyfunctional, so long as at least one reactive functional group is provided in its structure. The term "reactive functional group" is defined as any moiety which can react with a complementary moiety in the branching polymerization monomer to form a chemical bond. Such reactions encompass well-established chemical procedures for free radical, substitution or condensation reactions. Representative examples of a few of such reactions include the following:

| Functional Moiety | Complementary Moiety | Group Formed (Containing Covalent Bond) |
|---|---|---|
| —OH | $H_2C\overset{O}{\diagup\diagdown}CH-$ | $-O-CH_2-\overset{OH}{\underset{\|}{CH}}-$ |
|  | $H_2C\overset{NH}{\diagup\diagdown}CH-$ | $-O-CH_2-\overset{NH_2}{\underset{\|}{CH_2}}$ |
|  | HOOC— | $-O-\overset{O}{\underset{\|\|}{C}}-$ |
|  | O=C=N— | $-O-\overset{O}{\underset{\|\|}{C}}-\overset{H}{\underset{\|}{N}}-$ |
| —NH$_2$ | O=C=N— | $-\overset{H}{\underset{\|}{N}}-\overset{O}{\underset{\|\|}{C}}-\overset{H}{\underset{\|}{N}}-$ |
|  | HOOC— | $-\overset{H}{\underset{\|}{N}}-\overset{O}{\underset{\|\|}{C}}-$ |

Derivatives of such moieties are also intended to be included. The reactive functional group on the core reactant may be selected from either group of functional or complementary moieties so long as the moiety on the branching polymerization monomer is complementary to that moiety.

Monomeric core reactants include hydroxy compounds such as phenols and alkanols; amino compounds such as mono-, di- or polyamines; carboxylic acids and their derivatives; siloxanes; and other compounds which contain at least one reactive functional group.

The core reactant may be of polymeric, linear, branched or star configuration. Linear core reactants which have reactive functional groups include polymers such as polyethers, polyesters, polysiloxanes, polyurethanes, polyamines, polyamides, polyolefins, to name but a few. Preferred linear core reactants include polyalkylene oxide glycols, higher aliphatic polyols and related hydroxy-terminated compounds. In a particularly preferred embodiment, the linear core reactant contains two reactive functional groups, i.e., the valence v is preferably 2.

Core reactants providing a star configuration are defined as compounds which contain molecular chains having multiple functional groups covalently bonded through a chain of atoms to a single, central atom or backbone. Examples of such star reactants which contain functional hydroxyl groups are glycerol (v=3), pentaerythritol(v=4), dipentaerythritol (v=6) and trimethylolpropane (v=3). Such star core reactants may be extended by polymerizing monomers onto each molecular chain, prior to connected branch copolymer formation.

One molecule of a monomeric or polymeric core reactant is provided as a single starter for each connected branch copolymer molecule.

The second portion of the connected branch copolymer is a branch segment produced by reacting non-crosslinking, branching polymerization monomers with the core reactant. The non-crosslinking, branching polymerization monomers are defined as monomers having functional groups which provide an additional functional group after the monomer has been polymerized at two reactive sites of the monomer. In other words, each branching polymerization monomer provides at least one additional reactive site for polymer chain growth. When the branching polymerization monomer is reacted with a core reactant, one of the reactive functional groups of the monomer reacts with the complementary reactive functional group in the core reactant to produce a branched core compound having a mono-, di- or polyvalent core segment terminated with non-crosslinking, branching polymer segments having at least two branch ends, i.e., sites, defined by the other two reactive sites. One of the remaining reactive sites of the branching polymerization monomer provides a reactive site for extending the branched segment by reaction with another branching polymerization monomer. The remaining reactive site provides a functional group which can be used to initiate a branch, as described below. As a result, branching polymerization monomers containing three reactive sites produce b+1 branches per b moles of branching polymerization monomer for each reactive functional group on the core reactant.

The connected branch copolymers are preferably essentially free of any crosslinking in order to achieve the maximum reduction in neat viscosity without the formation of gel particles when used in aqueous systems. Crosslinking, on the other hand, of the connected branch structure would tend to increase the viscosity leading ultimately to gel formation.

Preferred non-crosslinking, branching polymerization monomers are compounds which undergo substantially linear homopolymerization. Such compounds contain a functional group at a third reactive site which does not readily react during the branching polymerization. Examples of such kinds of compounds include imines, hydroxy-containing oxiranes, and other polyfunctional compounds which are not crosslinkable.

Particularly preferred non-crosslinking branching polymerization monomers include compounds having three-membered oxygen- or nitrogen-containing ring structures, i.e., oxiranes and imines, respectively. In the case of oxirane compounds, there is an additional functional group present to provide the third reactive site for the branching polymerization monomer. A preferred class of branching polymerization monomers are compounds having the structure:

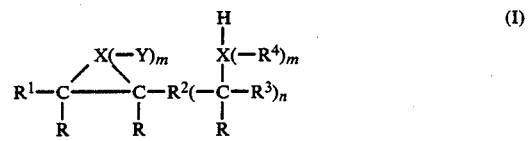

(I)

wherein X is nitrogen, oxygen, or sulfur; Y is alkyl, alkylamine, or hydroxyalkyl; R can be hydrogen or lower alkyl; $R^1$ and $R^3$ are each hydrogen, alkyl, aryl or aralkyl; $R^2$ is (1) an alkyl, aryl or aralkyl group which may be connected to $R^1$ to form a cyclic ring, or (2) hydrogen when n is 0, or (3) a covalent bond when n is 1; $R^4$ is hydrogen or lower alkyl; m is (1) 0 when X is oxygen or sulfur, or (2) 1 when X is nitrogen; n is 0 or 1, provided that n is 1 when X is oxygen or sulfur. When X is oxygen or sulfur, two reactive sites during polymerization are provided by the X and Y moieties, with a third reactive site provided by a carbon atom in the three-membered ring. When X is nitrogen, providing an imine, two of the three reactive sites are provided by the nitrogen atom with the other reactive site provided by a carbon atom in the three membered ring.

Particularly preferred branching polymerization monomers with the structure of Formula I are glycidol and ethyleneimine, i.e., aziridine.

The branching polymerization monomer may be added to the core reactant in a molar ratio of about 2 to about 50 moles, and preferably about 2 to about 20 moles, of branching polymerization monomer to each equivalent of core reactant. Since b moles of branching polymerization monomer provide b+1 branches for each reactive core terminal group, the average number of branches per branching segment can be defined by the formula:

$$\frac{b+1}{c} \qquad (II)$$

wherein b is the number of moles of branching monomer added, and c is the number of reactive functional groups on the core reactant. Using this relationship, it is apparent that the branching structure of the connected branch copolymer can be controlled by varying the amount of branching polymerization monomers utilized as well as by selecting core reactants with differing numbers of reactive terminal groups. Thus, for example, if a linear core segment (c=2) is employed, the average number of terminal bonds t of the branched polymer segments in the resulting connected branch copolymer will be from about 1.5 to 25.5, and preferably from 1.5 to about 10.5.

In another embodiment, a linear polymerization monomer may be copolymerized with the branching polymerization monomer during the branching polymerization step to provide a randomly branched copolymer structure as the branched segment. The addition of linear polymerization monomers does not change the number of branches in that the relationship of b+1 branches per b moles of branching polymerization monomer is maintained. Instead, the average distance between branches is extended depending upon the amount of linear polymerization monomer provided. This results in a reduced branching density within the branched segment. Any of the linear polymerization monomers set forth below, which can undergo polymerization with the branching polymerization monomer, can be utilized to provide copolymerization.

The core reactant and branching polymerization monomer may be selected so that the core segment comprises units identical to monomeric units present in the branched polymer segment. Such a complex branched core segment can be produced by providing a core segment identical to linear polymerization monomers copolymerized with branching polymerization monomers during the branching polymerization step. For example, a core reactant such as ethylene glycol will provide an ethylene diether core segment indistinguishable from oxyethylene monomeric units derived by reacting ethylene oxide as a linear polymerization monomer which may be added during the branching polymerization step. The valence v of such a complex core segment is limited only by the difficulty of synthesising complex core segments with large valences.

The third part of the connected branch copolymer structure is generated by reacting linear polymerization monomers on to the reactive sites in the branches of the branched core compound after the branching polymerization has been completed. The linear polymerization monomer is polymerized on to substantially each branch reactive site to produce sets of linear polymer segments for each branched polymer segment. In this manner, the linear polymer segments polymerized on to each branch reactive site provide branches with substantially similar chain lengths and compositions extending from each branch end. The chain length will depend upon the amount of linear polymerization monomer added, whereas the composition will depend upon the monomer or mixture of monomers provided during linear polymerization.

The term "substantially similar" is based on a statistical average for all connected branch copolymer molecules produced. With regard to composition, homopolymer linear segments will provide identical compositions within a group of such segments. For random or block copolymer linear segments, the composition will vary somewhat between individual segments but will provide an overall average of similar copolymeric substitution typical of random or block copolymers. With regard to chain-length, most of the linear copolymerization segments will fall within a relatively narrow range of monomeric units per segment.

The average chain length of the linear polymer segments may vary, depending upon the reaction kinetics of the linear polymerization monomer utilized. With respect to the preferred alkylene oxide monomers, epoxide rings exhibit greater reactivity toward primary, as opposed to secondary, hydroxyl groups. As a consequence, the average chain length for linear polymer segments extending from branch ends with primary hydroxyl groups will be greater than the average chain length for linear polymer segments extending from branch ends having secondary hydroxyl groups.

The proportion of primary to secondary hydroxyl groups is also important in determining reaction kinetics. The presence of predominantly secondary hydroxyl groups will result in a lower probability for chain length extension from the single, terminal, primary hydroxyl group in each branched polymer segment.

Chain length reaction kinetics are also dependent upon the type of linear polymerization monomer. For example, ethylene oxide differs from the other alkylene oxides in that polymerization results in the production of primary hydroxyl groups, whereas polymerization of all the other alkylene oxides results in the formation of secondary hydroxyl groups. There will be correspondingly greater variation in chain length for ethylene oxide homopolymers and copolymers when such linear polymerization extends from a branched polymer segment containing predominantly secondary hydroxyl groups.

In addition, greater steric availability of the hydroxyl groups near the ends of the branched polymer segments remote from the core segment provides greater reactivity, resulting in the higher probability of chain length extension than at those branch ends having relatively higher steric hindrance, due to their proximity to the center of the core compound.

Chain lengths within each group of linear polymer segments are therefore "substantially similar" when considering that these competing reaction kinetics will provide a statistical average of chain lengths over a large number of molecules. The extent of chain length formation will vary directly with the amount of linear polymerization monomer utilized.

The linear polymerization monomer may be any compound or mixture of compounds which undergoes linear polymerization initiated by reacting onto the functional groups at the branch ends of the branched core reactant. Such monomers include alkylene oxides; lactones; lactams; and thio derivatives of the foregoing compounds; alkylene carbonates; siloxanes; alkyleneimines; or monomers which undergo linear copolymerization, such as dicarboxylic acids with diols or diamines, to produce polyesters or polyamides respectively; diisocyanates and glycols producing polyurethanes; and so on, so long as the linear polymerization monomer contains a reactive group which can react with the branch end of the branched core compound. The linear polymer segment may be a block or random copolymer such as result from combinations of monomers capable of linear copolymerization.

Preferred linear polymerization monomers include alkylene oxides and co-monomer mixtures thereof, such as ethylene oxide, propylene oxide or mixtures thereof. The co-monomers may be added simultaneously to form a linear random copolymer segment, or sequentially to form a linear block copolymer segment.

The amount of linear polymerization monomers added may be from about 2 to about 600 moles, and preferably between 2 and about 350 moles, of linear polymerization monomer per branch end in the branched core compound.

Both branching and linear polymerization reaction steps may be carried out in the presence of suitable adjuvants, solvents, stabilizers, catalysts and other polymerization aids well known to those skilled in the art.

Various catalysts may be utilized in varying amounts, depending upon the type of polymerization being conducted and in particular, upon the factors discussed below. Suitable catalysts include caustic materials, such as alkali or alkaline earth metals or their corresponding hydroxides and alkoxides; Lewis acids; mineral acids, and so on. Selection of specific catalysts is considered to be within the skill of the art. Crown ethers can be used as rate assisting agents.

The amount of catalyst employed during the branching and linear polymerization reaction steps is important for obtaining the uncapped connected branch copolymers. The amount of catalyst employed in the branching polymerization reaction step should be sufficient to effect substantially complete reaction of the core reactant with the non-crosslinking, branching polymerization monomer. Likewise, the amount of catalyst employed in the linear polymerization reaction step should be sufficient to effect substantially complete reaction of the branched core compound with the linear polymerization monomer, and to provide an essentially uniform distribution of linear polymerization monomer along each branch of the branched core compound. While not wishing to be bound by any particular theory, there is evidence to believe that the amount of catalyst is dependent upon (1) the total functionality of the non-crosslinking, branching polymerization monomer, (2) the particular core reactant employed in preparing the connected branch copolymers, and (3) the solubility and dissociation properties of the catalyst itself.

The total functionality ratio of the non-crosslinking, branching polymerization monomer, e.g., glycidol, based on the moles of catalyst can be determined according to the following formula:

$$T = M_m([M_m/M_c] + F)/M_t$$

wherein: T is the total functionality ratio of monomer to catalyst; $M_m$, $M_c$ and $M_t$ are the numbers of moles of monomer, core and catalyst respectively; and F is the functionality of the core. As a typical illustration, in a reaction system containing 0.08 moles of difunctional core reactant, 0.49 moles of non-crosslinking, branching polymerization monomer and 0.06 moles of catalyst, the ratio of moles of catalyst to total functionality of non-crosslinking, branching polymerization monomer is 1:66.

The ratio of moles of catalyst to total functionality of non-crosslinking, branching polymerization monomer will vary for reaction systems employing different catalysts and different core reactants. For instance, for reaction systems employing sodium hydroxide as the catalyst and polyethylene glycol as the core reactant, the ratio of moles of catalyst to total functionality of non-crosslinking, branching polymerization monomer is preferably at least about 1:75. For reaction systems employing potassium hydroxide as the catalyst and random propylene oxide/ethylene oxide copolymer as the core reactant, the ratio of moles of catalyst to total functionality of non-crosslinking, branching polymerization monomer is preferably at least 1:38. For reaction systems employing potassium hydroxide as the catalyst and methoxy polyethylene glycol as the core reactant, the ratio of moles of catalyst to total functionality of non-crosslinking, branching polymerization monomer is preferably at least about 1:450.

It is believed that the differences in the minimum ratio values for reaction systems employing different catalysts and core reactants can be attributed to the ability of the various core reactants to solvate the catalyst ion pair, e.g., RO⁻K⁺, wherein RO⁻ is the anion derived from the core reactant and K⁺ is the potassium cation derived from the catalyst. The active species is the highly dissociated, highly solvated ion pair. If the ion pair is bound more tightly and is less solvated, more moles of catalyst would be required to shift the equilibrium sufficiently so as to obtain at least a similar number of dissociated ion pairs. Thus, the amount of catalyst employed in the branching and linear polymerization reactions is dependent upon the solubility and dissociation properties of the particular catalyst in the core reactant. Reaction systems employing polyethylene glycol as the core reactant generally solvate the ion pair well forming highly dissociated species. Reaction systems employing random propylene oxide/ethylene oxide copolymer in the core reactant generally solvate the ion pair less readily and therefore require more catalyst. It is expected that as the propylene oxide content of the core reactant increases, a concomitant increase in amount of catalyst will be required for the particular reaction system.

At ratios less than the minimum values for the particular catalyst and core reactant employed in preparing the uncapped connected branch copolymers, it has been found that the desired branching and linear polymerization reactions do not occur properly; therefore, the uncapped connected branch copolymers cannot properly be prepared at ratios less than the above minimum values. For example, when glycidol issued as the non-crosslinking, branching polymerization monomer in a reaction system containing a ratio of moles of catalyst to total functionality of non-crosslinking, branching polymerization monomer of less than the above minimum ratio values, basis exist to believe that homopolymerization of glycidol occurs thereby providing for the formation of an essentially linear polymer having a generally broad molecular weight distribution.

The branching and linear polymerization reactions may be conducted within a temperature range from about 50° to about 300° C., preferably from about 90° to about 150°C., and most preferably from about 100° to about 120° C. The reactions may be conducted under an inert atmosphere at atmospheric or super-atmospheric pressures, preferably from about 10 to about 200 psig, and most preferably from about 15 to about 65 psig.

The type or amount of catalyst, temperature, pressure and other polymerization parameters will vary depending upon the type of polymerization as discussed above, using those procedures, i.e., batch or continuous methods, well established in the prior art.

The polymerization reactions are generally conducted for a period of time sufficient to enable substantially all of the monomers to be consumed, i.e., for the polymerization to go to completion, i.e., exhaustion, so as to minimize monomer content in the connected branch copolymer product and to provide the desired connected branch copolymer. Depending upon the amount and type of monomers provided, the time will vary and may take 6 hours or more for each polymerization step. Overall reaction time to form a highly branched copolymer will usually be less than 64 hours, preferably less than 36 hours, and most preferably less than 8 hours, when the process involves a series of sequential polymerizations.

The branching polymerization monomers are preferably added slowly during the branching polymerization step in order to avoid the formation of monomer homopolymerization competing with polymerization onto the core reactant. The branching polymerization monomers are maintained at a temperature, prior to the addition thereof in the branching polymerization step, sufficient to avoid the formation of gel particles in the reaction mixture, e.g., oftentimes at a temperature below 30° C., preferably at a temperature of from about 0° to 10° C.

The two steps of branching and linear polymerizations may be repeated sequentially to the extent desirable and feasible in the particular reaction system used. Approximately 20 such repetitions is considered to be a practical maximum, although not limitative. Preferably the two steps are repeated from 1 to about 10 times. This repetition produces a connected branch copolymer consisting of alternating branched and linear polymer segments. The branching polymerization which occurs subsequent to a linear polymerization step entails reacting the branching polymerization monomer with the functional group at the end of the linear segments of the connected branch copolymer to provide a branch segment extending from each linear segment. The number of linear segments therefore increases with each subsequent branching step, such that the resulting branched copolymer may contain a large number of linear segments formed during the last polymerization step in a long series of polymerizations. As a result of the sequential polymerization steps, divalent linear segments are provided within the connected branch copolymer between branched polymer segments. Monovalent linear segments are provided only by the last linear polymerization step. When the polymerization sequencing is ended with a branching polymerization step, the connected branch copolymer obviously contains only divalent linear segments. The uncapped connected branch copolymer will always contain two or more sets of linear polymer segments having substantially similar chain lengths and compositions within each set based upon a single linear polymerization step. When multiple linear polymerizations are conducted, however, the group of linear polymer segments formed during one polymerization step can be varied substantially from that of other, separate polymerization steps.

Thus, for example, when at least two branching polymerization steps and at least two linear polymerization steps are employed in their preparation, the uncapped connected branch copolymers will have a first group of divalent linear polymer segments containing terminal bonds connected to a second set of about $v(t-1)$ branched polymer segments each having an average of about say $t^1$ terminal bonds, each of the branched polymer segments in the second set being connected to a second set of linear polymer segments, with an average of $(t^1-1)$ linear polymer segments per set, wherein $t^1$ is greater than about two, providing a second group of about $(t^1-1)[v(t-1)]$ linear polymer segments in the second set, the linear polymer segments having substantially similar chain lengths within the second group.

The branching and linear polymerization reactions are conducted with sufficient agitation or mixing of the reaction ingredients so as to enable essentially all of the ingredients to be reacted, and to substantially reduce the formation of gel particles in the reaction mixture. Sufficient agitation of the reactor ingredients is necessary to provide branches with substantially similar chain length and composition. The polymerization reactions are conducted so as to maintain kinetic control and prevent diffusion control.

The uncapped connected branch copolymer may be recovered using procedures well established in the art, and may include subsequent processing steps, such as ion exchange, and/or neutralization using, for example, magnesium silicate, phosphoric acid, acetic acid or other well known neutralizing agents, in order to obtain the desired product in a stable form.

In a typical embodiment, a catalyzed core reactant is charged to a reactor at about 110° C. under 20 psig of nitrogen. The branching polymerization monomer or mixture of monomers maintained at a temperature below 10° C. is then added slowly to the reactor vessel with continuous agitation. The reaction is continued until substantially all the branching polymerization monomers have been consumed. The resulting product can then be isolated before undergoing additional polymerization or, if the linear polymerization can be conducted using the same catalyst, the linear polymerization monomer or monomer mixture can be added to the reactor vessel with continuous agitation, and the reaction allowed to go to completion.

If so desired, the branching and linear polymerizations are then repeated under similar conditions using the same constituents, or under different polymerization conditions, as required, if the branching or linear polymerization monomers are changed and require different reaction conditions. Once the polymerization reactions have been completed, the connected branch copolymer product is removed from the reactor vessel, and may be neutralized and recovered.

Using such a procedure, an uncapped connected branch copolymer is produced with a core segment, and relatively ordered portions of alternating branched and linear polymer segments. The term "connected branch copolymers" is derived from the structure of the capped copolymers of the present invention and their uncapped precursors containing branched polymer segments which are connected through a di- or polyvalent core segment and/or through divalent linear segments. As such the copolymers of the present invention and their precursors always have a connected branch structure. In one sense, each branched polymer segments having pendant linear polymer segments has a comb polymer structure wherein the branched segment represents the back of the comb with the linear segments forming the teeth. Viewed in this way, the copolymers of the present invention and their precursors can be regarded as connected comb polymers wherein the core segment and each divalent linear segment may end in comb substructures. The structures of the connected branch copolymers provide a unique molecular architecture quite different from the structures disclosed in the prior art. Examples of differing types of uncapped connected branch copolymers are shown and described in FIGS. 1-6 and the accompanying description of our aforementioned copending application Ser. No. 641,640.

Preferred uncapped connected branch copolymers contain divalent linear polymer segments extending between separate branched polymer segments. Monovalent linear polymer segments provide the terminal portions of the polymer remote from the core segment. The end of the monovalent linear polymer segments may be provided with a reactive group, such as amino, carboxyl, siloxyl, phosphate and hydroxyl. Esters, salts and amides of acidic groups can also be used. Preferably, the terminal functional group is a hydroxyl group.

The core segment of the uncapped connected branch copolymer preferably has a linear or star structure. A linear core segment could be monovalent but preferably would be divalent with branching polymer segments at both terminal bonds. Representative examples of linear core segments include polysiloxanes, polyoxyalkylenes, polyphosphazines, polyalkylenes, polyethers, polyamides, polyurethanes and alkyl ethers. Star core segments are preferably polyethers derived from polyols such as glycerol, pentaerythritol, dipentaerythritol, trimethylol propane, trimethylol ethane; or disaccharides such as sucrose, glucose, mannitol or sorbitol.

Preferred branching polymer segments include polyamines and polyethers. A preferred branching polymer segment is a glycidyl polyether. Glycidyl polyethers derived from methyl glycidyl ether may also be employed.

Representative examples of linear polymer segments include polyethers, polyamines, polyphosphazines or polysiloxanes. Preferred linear polymer segments include oxyethylene, oxypropylene, or random or block copolymers thereof.

The connected branch copolymers of the invention have a core segment with a valence, v of greater than or equal to one and preferably two. The average valence of each branched polymer segment per set (t, t', t'' and so on, depending on the number of sets) is at least about 3, preferably between about 3 and about 50, and most preferably between about 3 and about 20.

Defined in terms of structural formula, the uncapped connected branch copolymers may be represented as:

  (III)

wherein A is a core segment having a valence of $z+1$; B and B' are non-crosslinked, branched polymer segments having valences of $m+1$ and $n+1$ respectively; C and C' are linear polymer segments having substantially similar chain lengths and composition within each group of x or y segments; m is greater than 1 and may vary between each set of y linear polymer segments; n is (1) greater than 1 or (2) may be 0 when y is greater than 0; x is (1) 1 when y is 0 or (2) m when y is 1 and the product of all m values when y is greater than 1; y and z are each integers greater than or equal to 0; provided that y is at least 1 when z is 0.

Formula III utilizes particular parenthetical notations. Covalent bonds between different segments which extend through parentheses or brackets designate serial repetitions, such that the polymer segments enclosed in the brackets having the y subscript represent a series of branched and linear segments repeating y times. Covalent bonds falling within the parenthetical notations, such as the bonds between the branched and linear polymer segments and within the braces, designate parallel repetitions. As such, the values for m, n and z define the number of bonds extending out from B, B' and A, respectively. In other words, m and n determine the valences of the branched polymer segments and z determines the valence of the core segment.

When viewed using the parameters in Formula III, the uncapped connected branch copolymers can be seen as containing a highly ordered arrangement of polymeric segments covering a wide variety of individual structures. The value y in Formula III equals the number of sequences in which the branching and polymerization steps have been repeated. The valence of the core segment, v, equals $z+1$. The valence of the branched polymer segments equals the corresponding m (or n) values $+1$.

A particularly preferred uncapped connected branch copolymer structure is:

  (IV)

wherein A, B', and C' and n are as previously defined; y is 0; and z is 1. An example of a connected branch copolymer satisfying Formula IV is one which contains a divalent linear core segment.

The physical properties of the uncapped connected branch copolymers may be controlled by varying the types of reactants and monomers used to make up the various core, branch and linear segments of the polymer. A beneficial characteristic which may be provided by these connected branch copolymers, useful in such applications as interfacial agents, can be established by providing relatively distinct hydrophobic and hydrophilic portions of the polymer. For example, the core segment can be made up of a relatively high molecular weight hydrophobic polymer, whereas the sets of linear polymer segments may be comprised of hydrophilic polymers, or vice versa. Due to the presence of a series of linear polymer segments, the linear segments portion of the polymer may provide an effective solvating means for a compound or a particle having a similar hydrophilicity to the linear segments within an otherwise hydrophobic environment similar to the hydrophobicity of the core segment.

Another characteristic of the uncapped connected branch copolymers relates to their capacity to provide a large number of functional groups at the free ends of the terminal linear polymer segments remote from the core compound. Due to the relative symmetry of the connected branch copolymer having linear polymer segments of substantially similar chain lengths and compositions within each set, a relatively large concentration of functional groups may be provided in a small area such that the polymer may act as a carrier for compounds which have the capacity to be associated with these functional groups. If the functional groups are hydroxyl groups or other groups capable of effecting hydrogen bonding, the association may be in the form of hydrogen bonding. If the functional groups are ionic species, the association may be in the form of ionic bonds.

As a result of the wide variety of characteristics which the uncapped connected branch copolymers may be prepared to have, these polymers may be useful in many applications. For example, in uses where viscosity control is of interest, viscosity is found to be one property of the uncapped connected branch copolymers which demonstrates an unexpected and advantageous distinction over similar polymers set forth in the prior art. Polyalkylene oxide uncapped connected branch copolymers have been shown to have lowered viscosities when compared to linear or star polyalkylene oxide polymers of similar molecular weight. Randomly branched polymers show a propensity for lowered viscosities similar to that of the uncapped connected branch copolymers, but significant differences exist between these two types of structures. In this regard, the uncapped connected branch copolymers may be designed to provide for a wide range of viscosities beyond the limits of the random branching structures, as well as lower viscosities than that which can be achieved through random branching. In addition, other properties can be varied, such as water solubility, to provide for completely water-miscible polymers as distinguished from the partially water-soluble, randomly branched prior art structures with similar molecular weight and composition.

Control of viscosity for high molecular weight polymers can be achieved through modification of chain length within a given composition. Linear polymers show an increase in viscosity with increasing molecular weight. Correspondingly, star polymers with the same polymer composition show a similar increase in viscosity with increase in molecular weight, but have correspondingly lower viscosities than the linear polymer structures. Uncapped connected branch copolymers show an even greater reduction in viscosity at the same molecular weight than the viscosity values of corresponding linear and star polymers.

Although not wishing to be bound to any particular theory, this phenomenon may be due to the shorter chain lengths of the uncapped connected branch copolymers when compared with the single chain length of the linear polymer, or the relatively few chain lengths of the star polymer, having similar molecular weights. A discussion of polymer viscosity may be found in an article entitled "Viscosity - Molecular Weight - Temperature - Shear Rate Relationships of Polymer Melts: A Literature Review," by N. G. Kumar, in the *Journal of Polymer Science: Macromolecular Reviews*, Volume 15, at pages 255–325 (1980). According to one theory, viscosity increases gradually with increasing chain length up to a critical point where chain length is sufficient to create chain entanglement, thereafter causing a significant increase in viscosity for increasing molecular weight. By providing highly branched structures, the critical point for chain entanglement can be extended significantly to much higher molecular weights, causing a significant reduction in viscosity for highly branched polymers when compared with linear or star polymers. Conversely, the uncapped connected branch copolymers can be provided with fewer and longer chain lengths, thereby approaching the structures and viscosities of the star polymers.

Randomly branched polymers can achieve a similar effect to some degree by varying the concentration of branching polymerization monomer in the bulk polymerization with the linear polymerization monomer. Randomly branched polymers, however, do not provide the flexibility in varying viscosity over a wide range, presumably since the orientation of linear segments within randomly branched polymers cannot be as readily varied as the chain length and orientation of linear segments in connected branch copolymers. Instead, randomly branched polymers inherently contain a wide variety of chain lengths of both branching and linear segments. Furthermore, randomly branched polymers show a dependence between viscosity and the amount of branching polymerization monomer provided, in that at higher molecular weights greater concentrations of branching polymerization monomer provide relative reductions in viscosity.

In contrast, the uncapped connected branch copolymers have no viscosity dependence upon the concentration of branching polymerization monomers within the polymer, and are therefore qualitatively distinct from randomly branched polymers with regard to viscosity control. There is, however, a viscosity relationship established for uncapped connected branch copolymers with respect to the amount of branching provided, such that greater branching will generally result in lowered viscosities. In addition, the critical point of chain entanglement in connected branch copolymers may be extended significantly beyond the critical points of the other polymer structures to provide lower viscosities at higher molecular weights than has heretofore been achieved.

The uncapped connected branch copolymers used in producing the capped copolymers of the present invention also possess an unexpected and useful property shown by an increase in viscosity for a reduction in molecular weight when the chain length of the terminal linear polymer segments is reduced to towards zero. This increase in viscosity may be the result of the interaction between the functional groups among the copolymer molecules or with the suspending medium. For example, when the functional groups are hydroxyl they may interact with the water molecules in an aqueous system resulting in a viscosity increase as the molecular weight is reduced. This is in sharp contrast to the general rule that decreases in molecular weight will always result in lowering viscosity for these kinds of polymers. This effect also demonstrates the potential for the connected branch copolymer structures at lower molecular weight ranges to exhibit additional properties and utility due to the presence of such a large concentration of functional groups.

Now that the uncapped connected branch copolymers, and the methods for their preparation, described in our aforementioned copending application Ser. No.641,640 have been described, the modifications introduced to produce the capped connected branch copolymers of the present invention, and their preparation and uses, will be described.

As already indicated, the capped connected branch copolymers differ from the uncapped connected branch copolymers in the presence of cap segments connected to terminals of the terminal linear polymer segments which are not connected to the branched polymer segments. Each of the cap segments comprises at least one residue of an alkylene oxide containing at least about 4 carbon atoms. The effect of adding the cap segments to the uncapped connected branch copolymers is to make the polymer less hydrophilic, and hence less water soluble, thereby overcoming the aforementioned disadvantages of relatively water soluble copolymers in color precursor compositions used in carbonless copying systems.

The capped connected branch copolymers of the invention contain on average at least about 0.5 alkylene oxide residues for each terminal of the terminal linear polymer segments not connected to the branched polymer segments. Because the polymerization processes (described in more detail below) used to form the cap segments are essentially random, the number of alkylene oxide residues in the various cap segments may differ, and indeed especially when the number of alkylene oxide residues is less than 1 for each free terminal of the linear polymer segments (i.e., for each terminal of the linear polymer segments not connected to the branched polymer segments), some of the free terminals of the linear polymer segments may not bear any cap segments at all. However, provided that the total quantity of alkylene oxide residues present is at least about 0.5 for each free terminal of the linear polymer segments, the capped connected branch copolymer will have the desired degree of water-insolubility.

As already explained, if more than one branching polymerization and more than one linear polymerization is used to form uncapped connected branch copolymers, these uncapped copolymers have at least two groups of linear polymer segments. In general, we do not recommend the use of uncapped connected branch copolymers having more than one set of branched polymer segments and more than one set of linear polymer segments in the preparation of the capped connected branch copolymers of the present invention, since such uncapped connected branch copolymers having multiple groups of branched and linear polymer segments appear to offer no real advantages over uncapped connected branch copolymer having only a single group of linear polymer segments, while the uncapped connected branch copolymers having multiple groups of branched and linear polymer segments are more complicated to synthesize. If, however, it is desired to use uncapped connected branch copolymers having multiple groups of branched and linear polymer segments in the synthesis of the capped copolymers of the present invention, it should be noted that, in such uncapped copolymers, only the last, outermost group of linear polymer segments will have free terminals, since the inner, earlier linear polymer segments will be connected at both ends to branched polymer segments, and hence in the corresponding capped connected branch copolymers of the invention, the cap segments will only be connected to the free terminals of the last, outermost linear polymer segments.

As explained above in the description of the uncapped connected branch copolymers, the last, outermost group of terminal linear polymer segments will often possess, at their free terminals, functional groups such as amino, siloxyl, phosphate, carboxyl or hydroxyl groups. When such functional groups are present on the free terminals of the linear polymer segments, attachment of the cap segment to the free terminals of the linear polymer segments will normally take place by condensation of an alkylene oxide with the functional group present on the free terminal, thereby leaving a residue of this functional group present in the final capped copolymer. For example, if the functional group present in the uncapped copolymer is a primary amino group, condensation of the alkylene oxide with such a primary amino group will result in the alkylene oxide cap segment being connected to the linear polymer segment via a secondary amino group. When the functional group at the free terminals of the uncapped copolymer is a hydroxyl group, condensation of the alkylene oxide will result in a cap segment connected to the linear polymer segment via an ether linkage. However, we do not exclude the possibility that the terminal linear polymer segments may bear groups which are capable of effecting hydrogen bonding and which are not changed upon the addition of the cap segments to the polymer.

Desirably, in the capped connected branch copolymers of the present invention, there are on average from about 0.75 to about 3, and most desirably about 1 to about 2 of the alkylene oxide residues for each free terminal of the terminal linear polymer segments.

As will be apparent to those skilled in the art from the description of the uncapped connected branch copolymers above, and of the synthesis of the capped connected branch copolymers given below, the molecular architecture of the capped connected branch copolymers of the invention can easily be varied using routine techniques which will be familiar to those skilled in the art. Accordingly, "tailoring" of the capped connected branch copolymers in any specific application can be achieved by means of routine techniques. However, for general guidance the preferred core, branched polymer, linear polymer and capped segments of the capped copolymers of the invention will now be described.

The connected branch copolymers are desirably organic polymers comprising only the elements carbon, hydrogen, oxygen, nitrogen, phosphorus and silicon, and preferably only the elements carbon, hydrogen, oxygen and nitrogen.

The chemical nature of the core segment is not usually of critical importance since in practice the core segment usually only comprises a relatively small part of the entire capped connected branch copolymer and has a correspondingly small influence upon its overall properties. However, it is preferred that the core segment be a divalent linear polymer connecting two polyvalent, non-crosslinked branched polymer segments. Preferably, the core segment comprises a linear polyether comprising alkylene oxide residues i.e. an oxyalkylene homopolymer, or a random or block copolymer of an oxyalkylene. Especially preferred core segments comprise ethylene oxide/propylene oxide copolymers and ethylene oxide homopolymers. The average molecular weight of the core segment is desirably in the range of about 4000 to 16,000.

The chemical nature of the branched polymer segments is also not usually critical in the capped connected branch copolymers of the invention; in practice, by far the greater the proportion of the molecular weight tends to reside in the linear polymer segments, and hence the chemical nature of the linear polymer segments tends to have more effect on the properties of the whole polymer than the chemical natures of the core and branched polymer segments. The most important parameter determined by the branched polymer segments is the number of branches (i.e. the number of linear polymer segments) in the capped copolymer; the number of branches is preferably from about 8 to about 30. The preferred material for forming the branched polymer segments is glycidol; if reduction of the branch density (i.e. increase in the spacing between adjacent branches) is desired, the branched polymer segments are desirably formed using glycidol and ethylene oxide.

As already mentioned, the properties of the capped connected branch copolymers tend to be dominated by the chemical natures of the linear polymer segments. As already mentioned, the terminal linear polymer segments of the uncapped connected branch copolymers used to prepare the capped copolymers of the present invention bear groups capable of effecting hydrogen bonding, and these groups, or residues thereof, are present in the capped copolymers. Appropriate groups capable of effecting hydrogen bonding include, for example, carboxylic acid groups, esters, salts and amides of carboxylic acid groups, amino groups, phosphate groups, esters, salts and amides of phosphate groups, and hydroxyl groups. Hydroxyl groups are preferred because of their strong hydrogen-bonding and hydrophilic properties. Furthermore, it is preferred that the terminal linear polymer segments of the uncapped connected ranch copolymer be hydroxyl-terminated polyoxyalkylene linear polymer segments since such linear polymer segments provide good hydrogen bonding properties and can readily be prepared from inexpensive monomers. The polyoxyalkylene terminal linear polymer segments may be oxyalkylene homopolymers or random or block copolymers of two or more alkylene oxides, the preferred forms of terminal linear polymer segment being an ethylene oxide/propylene oxide random copolymer and an ethylene oxide homopolymer. The average molecular weight of each of the groups of terminal linear polymer segments to which the cap segments are attached is preferably from about 4000 to about 10,000.

In the capped connected branch copolymers of the present invention, the cap segments comprise residues of relatively long chain alkylene oxides, preferably containing at least about 8 carbon atoms. Desirably the cap segments comprise residues of an epoxy alkane containing from about 8 to about 16 carbon atoms, and it is especially preferred that the cap segments comprise residues of a 1,2-epoxy straight-chain alkane containing from about 8 to about 16 carbon atoms. In general, the longer the alkylene oxide used to form the cap segments, and the greater the ratio of alkylene oxide residues to free terminals of the terminal linear polymer segments, the lower the water solubility of the capped copolymer. As will be apparent to those skilled in the art, the water solubility of the capped copolymer must be low enough to avoid the problems encountered in using prior art polyalkylene glycol polymers in color generating compositions, but should not be so low (and the capped copolymer thus so hydrophobic) that hydrophilic microcapsules cannot readily be dispersed therein. It is believed that those skilled in the art will have no difficulty in adjusting the degree of water solubility of the capped copolymer by appropriate variation of the chain length and quantity of alkylene oxide used.

The preferred average molecular weight range for the capped connected branch copolymers of the invention is approximately 20,000 to 80,000.

From the foregoing description, it will be seen that an especially preferred group of capped connected branch copolymers of the present invention are the capped copolymers in which the core segment comprises a linear polyether connected to two branch polymer segments each having an average of $t$ terminal bonds, which are in turn connected to a group of about $2(t-1)$ linear polyether polymer segments comprising residues of lower alkylene oxide monomers. Such lower alkylene oxide monomers preferably contain not more than about 3 carbon atoms.

As already mentioned, the capped connected branch copolymers of the first invention can be prepared by reacting an uncapped connected branch copolymer with an appropriate long chain alkylene oxide. Those skilled in the art will be familiar with the reaction conditions used to couple alkylene oxides to the various types of groups which may be present in the linear polymer segments of the capped connected branch copolymers, and such conventional conditions may be used in forming the cap segments of the capped copolymers of the present invention. Such reaction conditions also generally resemble those used to polymerize lower alkylene oxides on to branched polymer segments in the formation of the preferred polyoxyalkylene linear polymer segments, as described above with regard to the synthesis of the uncapped connected branch copolymers. When the linear polymer segments to which the long chain alkylene oxide is to be coupled are of the preferred hydroxyl-terminated polyoxyalkylene type, the coupling of the alkylene oxide is conveniently affected by treating the hydroxyl-terminated uncapped polymer with a strong base, such as an alkali metal alkoxide, and then reacting the resultant product with the long chain alkylene oxide, preferably at an elevated temperature, typically 100°–120° C.

The uncapped connected branch copolymers used as starting materials to prepare the capped copolymers have already been described above. It should be noted that it is often not necessary to prepare the uncapped connected branch copolymer in a pure state before reaction with the long chain alkylene oxide to form the capped copolymer. Instead, the formation of the cap segments is conveniently effected simply as one additional polymerization step at the end of the two or more polymerization steps used to form the uncapped connected branch copolymer. Thus, the uncapped copolymer is formed in situ and there reacted with the long chain alkylene oxide to form the capped copolymer of the present invention.

Although the low water solubility and other properties of the capped connected branch copolymers of the present invention may render them useful for a variety of purposes, as already mentioned the most important use presently envisaged for the capped copolymers is in the preparation of color precursor compositions for use in the preparation of carbonless coating sheets. To prepare such compositions comprising the capped connected branch copolymer and a plurality of color-precursor-containing microcapsules dispersed therein, the capped copolymer is heated above its transition temperature and an appropriate quantity of pre-formed microcapsules added thereto. The microcapsules are then dispersed in the melted capped copolymer, usually with appropriate agitation. Naturally, care should be taken not to use a degree of agitation which will result in rupture of the microcapsules and consequent premature release of the color precursor. If desired or necessary, dispersion of the microcapsules in the capped copolymer may be assisted by adding dispersing agents to the melted capped copolymer.

The microcapsules used in the color generating compositions of the present invention can be the same as those used in prior art color generating compositions hence their nature and preparation will not be described in detail. The microcapsules may be formed using the encapsulating agents and techniques described in, for example, the aforementioned U.S. Reissue Pat. No. 24899 and U.S. Pat. Nos. 2,800,457, 2,800,458, 4,171,981, and 4,371,634. Obviously, in order that the microcapsules can be successfully dispersed in the melted capped copolymer without damage, the capped copolymer must have a transition temperature below the temperature at which damage to the microcapsules occurs. Accordingly, it is preferred that the capped copolymer have a transition temperature not in excess of about 70° C.

The coated sheet of the present invention comprises, as already mentioned, a flat sheet of solid material having on at least part of one of its surfaces a layer of a color precursor composition of the invention. In order that such a coated sheet will produce good impressions when used in conjunction with a copy sheet coated with a color developing composition, and also to avoid excessive consumption of the relatively expensive color precursor composition, it is preferred that the layer of the color precursor composition have a thickness in the range of about 0.02 to 1 mm.

In contrast to the conventional coating processes using aqueous dispersions of microcapsules, the coated sheet of the present invention can be prepared by a dry process in which a color precursor composition of the invention is heated to a temperature above its transition temperature, this temperature being insufficient to cause substantial rupturing of the microcapsules therein, so rendering the color precursor composition flowable, and this flowable color precursor composition is then spread onto a sheet of solid material and allowed to cool below its transition temperature to produce a coherent solid layer of the color precursor composition on the sheet. Since it is not necessary to disperse the color precursor composition of the invention in water or a solvent in order to spread the composition on the sheet, the coated sheet of the invention can be produced without the problems of curling and wrinkling encountered when aqueous dispersions are used to coat the sheets.

The coated sheets of the invention are used in conjunction with conventional copy sheets having a surface coated with a Lewis acid. Obviously, if multiple copies are desired copy sheets may be used having a Lewis acid on their front surfaces and a layer of the color precursor composition of the invention on their rear surfaces. Also, top sheets of the invention and associated copy sheets may be releasably secured together in the conventional manner either in single sets comprising one top sheet together with one or more associated copy sheets, or as a pad comprising a plurality of sets of sheets.

The following Examples are now given, though by way of illustration only, to show details of particularly preferred reagents, conditions and techniques used in the capped connected branch copolymers, compositions and processes of the present invention:

EXAMPLE 1

This Example illustrates the preparation of a capped connected branch copolymer of the invention.

420 g. of UCON Fluid 75-H-1400 (a commercially-available linear random ethylene oxide/propylene oxide copolymer produced by Union Carbide Corporation and having a molecular weight of approximately 2000; UCON is a Registered Trademark of Union Carbide Corporation) were placed in a container and 2.63 g. of flaked potassium hydroxide and 100 g. of absolute ethanol added. The ethanol and the water (coproduced) were removed under vacuum at 110° C. 417 g. of the resultant core reactant were charged to a half gallon (1.91 l.) Parr autoclave, which was heated to 110° C. and filled with a nitrogen atmosphere at 20 psig. While maintaining these conditions of pressure, atmosphere and temperature, ethylene oxide and propylene oxide were slowly fed simultaneously at a ratio of 3 parts by weight of ethylene oxide to 1 part by weight of propylene oxide until a total of 811 g. of ethylene oxide and 270 g. of propylene oxide had been fed. The resultant polymerization reaction was allowed to proceed to completion and 1441 g. of the resultant polymer were removed from the reactor and neutralized with 2.5 ml. of 5% phosphoric acid.

To 410 g. of this intermediate polymer was added a solution of 2.4 g. of flake potassium hydroxide in absolute ethanol. The water and ethanol were removed under vacuum as before, and 391 g. of the resultant reactant were charged to the same autoclave as before. Next, 143 g. of distilled glycidol were added incrementally to the autoclave and the resulting polymerization reaction allowed to proceed to completion. 49 g. of propylene oxide and 151 g. of ethylene oxide were then slowly fed simultaneously to the autoclave and the resulting polymerization reaction allowed to proceed to completion. 208.7 g. of the resultant polymer were removed from the autoclave. 557 g. of ethylene oxide and 185 g. of propylene oxide were then fed to the autoclave in the same manner as before and the resulting polymerization reaction allowed to proceed to completion. 334 g. of the resultant product were removed from the autoclave and neutralized with 0.74 ml. of 85% phosphonic acid. A further 313.5 g. of ethylene oxide and 104.5 g. of propylene oxide were fed to the autoclave in the same manner as before and the resulting polymerization reaction allowed to proceed to completion. All the resultant polymer was removed from the autoclave and neutralized.

To 210 g. of this polymer was added a solution of 3.0 g. of potassium hydroxide in 100 g. of absolute ethanol. The water and ethanol were removed as before and 195 g. of the resultant reactant charged to the autoclave. Under the same reaction conditions as before, 773 g. of ethylene oxide and 258 g. of propylene oxide were fed simultaneously to the autoclave, and the resulting polymerization reaction allowed to proceed to completion to provide a final uncapped connected branch copolymer, all of which was removed from the autoclave.

1.0 g of sodium hydroxide pellets and 100 ml of methanol were mixed together until the sodium hydroxide had completely dissolved. 200 g of the uncapped connected branch copolymer prepared as described above were placed in a 500 ml single-neck flask and the sodium methoxide solution added. The flask was then placed on a rotary evaporator and the methanol and water produced removed at 60° C. under 10 mm Hg pressure.

The material remaining in the flask was transferred to a 500 ml four-neck flask equipped with a stirrer and a thermometer. To this flask was added 1.00 g of 1,2-epoxyhexadecane. The flask was then heated to 120° C. under a nitrogen purge and maintained at 120°–123° C. for four hours. The heating was then discontinued and the flask allowed to cool to room temperature. The material remaining in the flask was a capped connected branch copolymer of the present invention. This material was mainly clear, although some insoluble material was present on the bottom of the flask.

For viscosity measurements, 40 g of the product was made into a 20 percent solution in propanol and diluted with 200 g of distilled water. This solution was hazy and had a viscosity of 120cps at 26° C. A similar 2 percent solution of the capped connected branch copolymer was clear and had a viscosity of 90cps at 26° C.

EXAMPLE 2

This Example illustrates the preparation of a second capped connected branch copolymer of the present invention.

300 g. of CARBOWAX PEG 3350 (a commercially-available linear polyethylene glycol produced by Union Carbide Corporation and having a molecular weight of approximately 3350; CARBOWAX is a Registered Trademark of Union Carbide Corporation) were placed in a container and 4.8 g. of 50% aqueous sodium hydroxide solution added. The container was then sparged for six hours with nitrogen at 155° C. to remove the water. 260 g. of the resultant reactant were charged to a half-gallon autoclave, which was heated to 120° C. and filled with a nitrogen atmosphere at 20 psig. While maintaining these conditions of pressure, atmosphere and temperature, 36 g. of glycidol were fed to the autoclave and the resulting polymerization reaction allowed to proceed to completion. A sample weighing about 40 g. was removed for viscosity and basicity analysis. 50 g. of ethylene oxide were then fed slowly to the autoclave and the resulting polymerization reaction allowed to proceed to completion. A second sample was then removed for viscosity and basicity analysis. A further 866 g. of ethylene oxide were fed slowly to the autoclave and the resulting polymerization reaction allowed to proceed to completion. A third sample was then removed for viscosity and basicity analysis. A further 172 g. of ethylene oxide were slowly fed to the autoclave and the resulting polymerization reaction allowed to proceed to completion. A fourth sample was then removed for analysis. A further 100 g. of ethylene oxide were fed slowly to the autoclave and the resulting polymerization reaction allowed to proceed to completion. A fifth sample was removed for analysis. 100 g. of product were then removed from the autoclave, and treated with a mixture comprising 57% of 85% phosphoric acid and 43% of acetic acid. Distilled water was added in an amount of 50% by weight of the resultant mixture, and the resulting solution was ion-exchanged sequentially with IR-200 and IRA-900 resins. The water in the resultant solution was removed under vacuum at 100° C.

200 g of this uncapped connected branch copolymer was placed in a single-neck flask and a solution made by dissolving 1 g of potassium hydroxide in ethanol was added to the flask. The resultant mixture was heated to 80° C. under a pressure of 10 mm Hg for two hours to remove the water and ethanol.

After the two hour heating period, the flask was allowed to cool and the contents thereof transferred to a 500 ml four-neck flask equipped with a thermometer and a stirrer. The flask was heated to 120° C. using a heating mantle. The flask was filled with a nitrogen atmosphere and 21 g of 1,2-epoxyhexadecane were added dropwise while the flask was maintained at 120° C. After the addition of the epoxy compound had been completed, the flask was held at 120° C. under the nitrogen atmosphere for two hours, and then allowed to cool to room temperature. The resultant capped copolymer of the invention will hereinafter be referred to as capped copolymer 2A.

A further capped copolymer of the invention was prepared by a similar procedure, except that the quantity of 1,2-epoxyhexadecane used was 64 g, and after the addition of the epoxyalkane had been completed the heating at 120° C. was continued for 3.5 hours before the flask was allowed to cool. The resultant capped connected branch copolymer of the invention will hereinafter be referred to as capped copolymer 2B.

Capped copolymer 2A was found to have a hydroxyl number of 28.1 and an epoxide equivalent weight of 11104.6, while capped copolymer 2B was found to have a hydroxyl number of 25.6 and an epoxide equivalent weight of 9632.4. Capped copolymer 2A was found to be slightly soluble in water at 0.5 percent, while capped copolymer 2B was completely insoluble in water at 0.5 percent.

In the case of capped copolymer 2A, the monomeric epoxyalkane was found to constitute 2.04 percent by weight of the polymer. Since the total amount of epoxyalkane used comprised 9.5 percent of the total weight of uncapped copolymer and epoxyalkane, this figure for remaining monomeric epoxyalkane indicated that 78.5 percent of the original epoxyalkane had been incorporated into the capped copolymer. In the case of capped copolymer 2B, the remaining monomeric epoxyalkane amounted to 2.38 percent of the weight of the capped polymer. Since the amount of epoxyalkane originally present was 24.2 percent by weight of the uncapped copolymer/epoxyalkane mixture, 90.1 percent of the original epoxyalkane was incorporated into the capped copolymer.

In order to determine whether additional incorporation of the epoxyalkane into the capped copolymers could be achieved, samples of capped copolymer 2A and 2B were placed in four-necked 500 ml flasks under the same conditions used for the original polymerization i.e., the flasks were equipped with a thermometer, a stirrer and a heating mantle, purged with nitrogen and heated to 120° C. The flasks were held at 120° C. for five hours, then allowed to cool and the proportion of monomeric epoxyalkane remaining in the capped copolymer determined by the same method as before.

After this additional treatment, the proportion of monomeric epoxyalkane remaining in capped copolymer 2A had been reduced to 0.90 percent by weight, so that the proportion of the original epoxyalkane incorporated into the capped copolymer had been increased to 90.5 percent. In the case of capped copolymer 2B, the remaining monomeric epoxyalkane after this additional treatment was 1.96 percent by weight of the polymer, so that the proportion of the original epoxyalkane incorporated into the capped copolymer had been increased to 91.9 percent.

It will be apparent to those skilled in the art that numerous changes and modifications can be made in the preferred embodiments of the invention described above without departing from the scope of the invention. Accordingly, the whole of the foregoing description is to be construed in illustrative and not in a limitative sense, the scope of the invention being defined solely by the appended claims.

We claim:

1. A capped connected branch copolymer comprising:
   (A) a core segment having a valence of v, wherein v is an integer, and having correspondingly v terminal bonds connected to:
   (B) v polyvalent, non-crosslinked branched polymer segments each having an average of t terminal bonds, wherein t is greater than about two, one of said terminal bonds being connected to said core segment, and each of said branched polymer segments being connected via its remaining (t−1) terminal bonds to:
   (C) a set of linear polymer segments, with an average of t−1 linear polymer segments per set, to provide a group of about v (t−1) linear polymer segments wherein the linear polymer segments have substantially similar chain lengths and composition within said group, the capped connected branch copolymer having a group of terminal linear polymer segments bearing groups capable of effecting hydrogen bonding; and
   (D) a set of cap segments connected to terminals of the terminal linear polymer segments which are not connected to the branched polymer segments, each of the cap segments comprising at least one residue of an alkylene oxide containing at least about 4 carbon atoms, there being on average at least about 0.5 of said alkylene oxide residues for each terminal of the terminal linear polymer segments not connected to the branched polymer segments.

2. A capped connected branch copolymer according to claim 1 comprising only the elements carbon, hydrogen, oxygen, nitrogen, phosphorus and silicon.

3. A capped connected branch copolymer according to claim 2 comprising only the elements carbon, hydrogen, oxygen and nitrogen.

4. A capped connected branch copolymer according to claim 1 wherein the core, branched and linear segments provide separate hydrophobic and hydrophilic portions of the polymer.

5. A capped connected branch copolymer according to claim 1 wherein the core segment has a linear or star structure.

6. A capped connected branch copolymer according to claim 5 having a divalent linear core segment connecting two polyvalent, non-crosslinked, branched polymer segments, which are in turn connected to two sets of linear polymer segments.

7. A capped connected branch copolymer according to claim 6 wherein the linear core segment comprises a polysiloxane, polyoxyalkylene, polyphosphazine, polyalkylene, polyester, polyamide, polyurethane, or an alkyl ether.

8. A capped connected branch copolymer according to claim 5 wherein the star core segment comprises a polyether derived from reacting an alkylene oxide with glycerol, pentaerythritol, dipentaerythritol, or trimethylolpropane.

9. A capped connected branch copolymer according to claim 5 wherein the liner core segment comprises an oxyalkylene homopolymer, or a random or block copolymer of an oxyalkylene.

10. A capped connected branch copolymer according to claim 9 wherein the linear core segment further comprises a glycidyl polyether derived from methyl glycidyl ether.

11. A capped connected branch copolymer according to claim 9 wherein the core segment comprises an ethylene oxide/propylene oxide random copolymer or an ethylene oxide homopolymer.

12. A capped connected branch copolymer according to claim 9 wherein the core segment has an average molecular weight in the range of about 4000 to about 16,000.

13. A capped connected branch copolymer according to claim 1 wherein at least one branched polymer segment comprises a polyether or polyimine.

14. A capped connected branch copolymer according to claim 1 wherein at least one branched polymer segment comprises residues of a monomer of the formula:

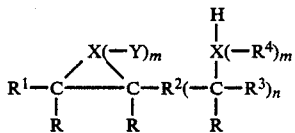

wherein X is nitrogen, oxygen, or sulfur; Y is alkyl, alkylamine or hydroxyalkyl; R is hydrogen or lower alkyl; $R^1$ and $R^3$ are each hydrogen, alkyl, aryl or aralkyl; $R^2$ is (1) an alkyl, aryl or aralkyl group which may be connected to $R^1$ to form a cyclic ring or (2) hydrogen when n is 0, or (3) a covalent bond when n is 1; $R^4$ is hydrogen or lower alkyl; m is (1) 0 when W is oxygen or sulfur or (2) 1 when X is nitrogen; n is 0 or 1 provided that n is 1 when X is oxygen or sulfur.

15. A capped connected branch copolymer according to claim 13 wherein at least one branched polymer segment comprises a glycidyl polyether.

16. A capped connected branch copolymer according to claim 15 wherein the glycidyl polyether is derived from glycidol.

17. A capped connected branch copolymer according to claim 1 wherein at least one branched polymer segment comprises a polyimine derived from aziridine.

18. A capped connected branch copolymer according to claim 1 wherein at least one branched polymer segment has a reduced branching density due to the presence of linear polymer segments within the branched polymer segment.

19. A capped connected branch copolymer according to claim 1 wherein the terminal groups capable of effecting hydrogen bonding comprise carboxylic acid groups, esters, salts or amides of carboxylic acid groups, amino groups, phosphate groups, esters, salts or amides of phosphate groups, hydroxyl groups, or residues of any of such groups remaining after attachment of the cap segments to the terminal linear polymer segments via the terminal groups.

20. A capped connected branch copolymer according to claim 19 wherein the terminal groups capable of effecting hydrogen bonding comprise ether linkages remaining after attachment of the cap segments to the terminal linear polymer segments via terminal hydroxyl groups on the terminal linear polymer segments.

21. A capped connected branch copolymer according to claim 20 wherein the terminal linear polymer segments comprise polyoxyalkylene linear polymer segments.

22. A capped connected branch copolymer according to claim 21 wherein at least one linear polymer segment further comprises a glycidyl polyether derived from methyl glycidyl ether.

23. A capped connected branch copolymer according to claim 1 wherein the average number of terminal linear polymer segments is from about 8 to about 30.

24. A capped connected branch copolymer according to claim 1 wherein the average molecular weight of each of the group of terminal linear polymer segments is from about 4000 to about 10,000.

25. A capped connected branch copolymer according to claim 1 wherein the core, branched and linear polymer segments form a copolymer of the formula:

$$[[(C'\!\!\!-\!\!\!_{\overline{n}}B^1\!\!\!-\!\!\!_{\overline{x}}[(C)_mB\!\!\!-\!\!\!_{\overline{y}}]_zA\!\!\!-\!\!\![B(C)_{\overline{m}}]_{\overline{y}}[B'(C')_n]_x$$

wherein A is a core segment having a valence of $z+1$; B and $B^1$ are noncrosslinked, branched polymer segments having valences of $m+1$ and $n+1$, respectively; C and $C^1$ are linear polymer segments having substantially similar chain lengths and composition within each group of x or y segments; m is greater than 1 and may vary between each set of linear polymer segments; n is (1) greater than 1 or (2) may be 0 when y is 0 or (2) m when y is 1 and the product of all m values when y is greater than 1; y and z are each integers greater than or equal to 0; provided that y is at least 1 when z is 0.

26. A capped connected branch copolymer according to claim 25 having a structure such that in said formula y is 0 and z is 1, the core, branched and linear polymer segments thus forming a copolymer of the formula:

$$(C'\!\!\!-\!\!\!_{\overline{n}}B'\text{-}A\text{-}B\!\!\!-\!\!\!(C')_n$$

wherein A, $B^1$, $C^1$ and n are as defined in claim 25.

27. A capped connected branch copolymer according to claim 1 wherein there are on average from about 0.75 to about 3 of said alkylene oxide residues for each terminal of the linear polymer segments not connected to the branched polymer segments.

28. A capped connected branch copolymer according to claim 27 wherein there are on average from about 1 to about 2 of said alkylene oxide residues for each terminal of the linear polymer segments not connected to the branched polymer segments.

29. A capped connected branch copolymer according to claim 1 wherein the alkylene oxide residues comprise residues of an epoxyalkane containing from about 8 to about 16 carbon atoms.

30. A capped connected branch copolymer according to claim 29 wherein the alkylene oxide residues comprise residues of a 1,2-epoxy straight-chain alkane containing from about 8 to about 16 carbon atoms.

31. A capped connected branch copolymer according to claim 1 having a molecular weight in the range of about 20,000 to about 80,000.

32. A capped connected branch copolymer according to claim 1 having a transition temperature of not more than about 70° C.

33. A capped connected branch copolymer comprising:
(A) a core segment comprising a linear polyether connected to:
(B) two polyvalent, non-crosslinked branched polymer segments each having an average of t terminal bonds, wherein t is greater than about 2, one of the branched polymer segments being connected, via one of its t terminal bonds, to each end of the linear core segment, and each of the branched polymer segments being connected to:
(C) a set of linear polyether polymer segments, with an average of (t−1) linear polymer segments per set, to provide a group of about 2(t−1) linear polyether polymer segments wherein the linear polymer segments have substantially similar chain lengths and composition within the group, the linear polyether polymer segments comprising residues of alkylene oxide monomers containing not more than about 5 carbon atoms; and
(D) a set of cap segments connected to terminals of the linear polymer segments which are not connected to the branched polymer segments, each of the cap segments comprising at least one residue of an alkylene oxide containing at least about 8 carbon atoms, there being on average at least about 0.75 of said alkylene oxide residues for each terminal of the linear polymer segments not connected to the branched polymer segments.

34. A process for the preparation of a capped connected branch copolymer, the process comprising:
procuring an uncapped connected branch copolymer comprising
(A) a core segment having a valence of v, wherein v is an integer, and having correspondingly v terminal bonds connected to:
(B) v polyvalent, non-crosslinked branched polymer segments each having an average of t terminal bonds, wherein t is greater than about two, one of said terminal bonds being connected to said core segment, and each of said branched polymer segments being connected via its remaining (t−1) terminal bonds to:
(C) a set of linear polymer segments, with an average of t−1 linear polymer segments per set, to provide a group of about v(t−1) linear polymer segments wherein the linear polymer segments have substantially similar chain lengths and composition within said group, the connected branch copolymer having a group of terminal linear polymer segments bearing groups capable of effecting hydrogen bonding; and
reacting the uncapped connected branch copolymer with an alkylene oxide containing at least about 4 carbon atoms, the amount of the alkylene oxide reacted with the uncapped connected branch copolymer being at least about 0.5 molecule for each terminal of the terminal linear polymer segments of the connected branch copolymer which is not connected to the branched polymer segments, thereby causing the alkylene oxide to react with the terminal linear polymer segments of the uncapped connected branch copolymer to produce a set of cap segments connected to terminals of the terminal linear polymer segments which are not connected to the branched polymer segments, each of the cap segments comprising at least one residue of an alkylene oxide containing at least about 4 carbon atoms, there being on average at least about 0.5 of said alkylene oxide residues for each terminal of the terminal linear polymer segments not connected to the branched polymer segments.

35. A process according to claim 34 wherein the alkylene oxide reacts with the terminal groups capable of effecting hydrogen bonding so that, in the capped connected branch copolymer, the cap segments are connected to the terminal linear polymer segments via residues of said terminal groups.

36. A process according to claim 34 wherein the capped connected branch copolymer produced comprises only the elements carbon, hydrogen, oxygen, nitrogen, phosphorus and silicon.

37. A process according to claim 36 wherein the capped connected branch copolymer produced comprises only the elements carbon, hydrogen, oxygen and nitrogen.

38. A process according to claim 34 wherein, in the uncapped connected branch copolymer, the groups capable of effecting hydrogen bonding comprise carboxylic acid groups, esters, salts or amides of carboxylic acid groups, amino groups, phosphate groups, esters, salts or amides of phosphate groups, or hydroxyl groups.

39. A process according to claim 38 wherein, in the uncapped connected branch copolymer, the terminal linear polymer segments comprise hydroxyl-terminated polyoxyalkylene linear polymer segments.

40. A process according to claim 34 wherein the amount of the alkylene oxide reacted with the connected branch copolymer is from about 0.75 to about 3 molecules of the alkylene oxide for each terminal linear polymer segment of the uncapped connected branch copolymer.

41. A process according to claim 40 wherein the amount of the alkylene oxide reacted with the connected branch copolymer is from about 1 to about 2 molecules of the alkylene oxide for each terminal linear polymer segment of the uncapped connected branch copolymer.

42. A process according to claim 34 wherein the alkylene oxide is an epoxyalkane containing from about 8 to about 16 carbon atoms.

43. A process according to claim 42 wherein the alkylene oxide is a 1,2-epoxy straight-chain alkane containing from about 8 to about 16 carbon atoms.

44. A process according to claim 34 wherein the uncapped connected branch copolymer reacted with the alkylene oxide comprises:
(A) a core segment comprising a linear polyether connected to:
(B) two polyvalent, non-crosslinked branched polymer segments each having an average of t terminals bonds, wherein t is greater than about 2, one of the branched polymer segments being connected, via one of its t terminal bonds, to each end of the linear core segment, and each of the branched polymer segments being connected to:
(C) a set of linear polyether polymer segments, with an average of (t−1) linear polymer segments per set, to provide a group of about 2(t−1) linear polyether polymer segments wherein the linear polymer segments have substantially similar chain lengths and composition within the group, the linear polyether polymer segments comprising residues of alkylene oxide monomers containing not more than about five carbon atoms.

45. A process according to claim 34 wherein the uncapped connected branch copolymer reacted with the alkylene oxide has been produced by a process comprising:
(1) reacting a core reactant having at least one reactive terminal group with non-crosslinking, branching polymerization monomers by polymerizing these monomers to completion under polymerization conditions sufficient to produce a branched, core compound having a mono-, di- or polyvalent core segment terminated with non-crosslinked, branching polymer segments each having at least two branch sites remote from the core segment; followed by
(2) polymerizing at least one linear polymerization monomer onto the branch sites of the branched, core compound under polymerization conditions sufficient to provide a linearly extended, branched, core compound as a connected branch copolymer having linear polymer segments with substantially similar chain lengths and compositions extending from the branch sites.

46. A process according to claim 44 wherein the core reactant is a linear or star compound.

47. A process according to claim 46 wherein the core reactant is a divalent linear compound.

48. A process according to claim 47 wherein the core reactant comprises an alkylene oxide, or a random or block copolymer of alkylene oxides.

49. A process according to claim 48 wherein the core reactant comprises an ethylene oxide/propylene oxide random copolymer or an ethylene oxide homopolymer.

50. A process according to claim 34 wherein the branching polymerization monomer is glycidol.

51. A process according to claim 45 wherein the linear polymerization monomer comprises a co-monomer mixture of alkylene oxides.

52. A process according to claim 51 wherein the co-monomers are added sequentially to form linear, block copolymer segments.

53. A process according to claim 45 wherein the linear polymerization monomers are ethylene oxide, propylene oxide or mixtures thereof.

54. A composition for use in the preparation of carbonless copying sheets, the composition comprising a capped connected branch copolymer comprising:
(A) a core segment having a valence of v, wherein v is an integer, and having correspondingly v terminal bonds connected to:
(B) v polyvalent, non-crosslinked branched polymer segments each having an average of t terminal bonds, wherein t is greater than about two, one of said terminal bonds being connected to said core segment, and each of said branched polymer segments being connected via its remaining (t−1) terminal bonds to:
(C) a set of linear polymer segments, with an average of t−1 linear polymer segments per set, to provide a group of about v (t−1) linear polymer segments wherein the linear polymer segments have substantially similar chain lengths and composition with said group, the capped connected branch copolymer having a group of terminal linear polymer segments bearing groups capable of effecting hydrogen bonding; and
(D) a set of cap segments connected to terminals of the terminal linear polymer segments which are not connected to the branched polymer segments, each of the cap segments comprising at least one residue of an alkylene oxide containing at least about 4 carbon atoms, there being on average at least about 0.5 of said alkylene oxide residues for each terminal of the terminal linear polymer segments not connected to the branched polymer segments; and a plurality of microcapsules dispersed in the capped connected branch copolymer, these microcapsules comprising a color precursor.

55. A composition according to claim 54 wherein, in the capped connected branch copolymer, the terminal groups capable of effecting hydrogen bonding comprise carboxylic acid groups, esters, salts or amides of carboxylic acid groups, amino groups, phosphate groups, esters, salts or amides of phosphate groups, hydroxyl groups, or residues of any of such groups remaining after attachment of the cap segments to the terminal linear polymer segments via the terminal groups.

56. A composition according to claim 55 wherein, in the capped connected branch copolymer, the terminal group capable of effecting hydrogen bonding comprise ether linkages remaining after attachment of the cap segments to the terminal linear polymer segments via terminal hydroxyl groups on the terminal linear polymer segments.

57. A composition according to claim 56 wherein, in the capped connected branch copolymer, the terminal linear polymer segments comprise polyoxyalkylene linear polymer segments.

58. A composition according to claim 54 wherein the core segment of the capped connected branch copolymer comprises a linear polyether comprising alkylene oxide residues.

59. A composition according to claim 54 wherein, in the capped connected branch copolymer, at least one branched polymer segment comprises a glycidyl polyether.

60. A composition according to claim 54 wherein, in the cap segments of the capped connected branch copolymer, the alkylene oxide residues comprise residues of an epoxyalkane containing from about 8 to about 16 carbon atoms.

61. A composition according to claim 60 wherein, in the capped connected branch copolymer, the alkylene oxide residues forming the cap segments comprise residues of a 1,2-epoxy straight-chain alkane containing from about 8 to about 16 carbon atoms.

62. A composition according to claim 54 wherein the capped connected branch copolymer has a transition temperature not in excess of about 70° C.

* * * * *